UNITED STATES PATENT OFFICE 2,166,213

COLORING MATTERS OF THE PHTHALOCYANINE TYPE

Isidor Morris Heilbron, Manchester, England, Francis Irving, Grangemouth, Scotland, and Reginald Patrick Linstead, London, England, assignors to Imperial Chemical Industries Limited, a corporation of Great Britain No Drawing. Original application November 15, 1933, Serial No. 698,216. Divided and this application May 14, 1936, Serial No. 79,813. In Great Britain November 16, 1932

4 Claims. (Cl. 260—314)

This application relates to coloring matters of the phthalocyanine series, and constitutes a division of our copending application Serial No. 698,216, filed November 15, 1933, (Patent No. 2,116,602, issued May 10, 1938).

It is an object of this invention to provide an improved process for the manufacture of coloring matters of the phthalocyanine series, especially those which contain combined copper, and which will hereinafter be referred to as copper phthalocyanines. It is a further object of this invention to provide a process for the production of copper phthalocyanines which leads to a product of high purity. It is a further object of this invention to produce copper phthalocyanines of extremely high quality, and which are superior in chemical purity and coloring properties to the product obtainable by heating phthalic anhydride or phthalimide in the presence of copper compounds. Other and further important objects of this invention will appear as the description proceeds.

In British patent specification No. 322,169 there is described a process for the production of blue to green coloring matters by heating phthalic anhydride with ammonia and certain metals or metal compounds including iron, cuprous chloride and nickel sulphide. In British patent specification No. 389,842 (corresponding to U. S. Patent No. 2,000,051) there is described a process for the production of nitrogen-containing coloring matters of complex constitution which comprises heating an o-cyanoarylcarboxyamide in the presence of specified metals and metal compounds. These coloring matters are described as purple to green in color and stated to appear to belong to one general class, this class appearing to include the said coloring matters of British patent specification No. 322,169. British patent specification No. 389,842 also describes the production of metal-free coloring matters and gives probable formulae for a coloring matter containing magnesium and the corresponding metal-free coloring matter.

British patent specification No. 390,149 (corresponding to U. S. Patent No. 2,000,052) describes the production of the same coloring matter containing magnesium and the corresponding metal-free coloring matter and of substituted derivatives of these by heating a phthalimide with ammonia and magnesium or antimony.

We have now found that coloring matters of the same general series, but of improved properties, can be obtained by heating an o-arylene dicyanide, for instance phthalonitrile, with copper or copper compounds in the absence of a base or in the absence of any solvent whatever.

We have also found that substituted phthalonitriles and o-dinitriles of naphthalene and anthracene may be used instead of phthalonitrile. The so-obtained coloring matters are typically blue to green in shade, have only slight solubility in organic solvents, but dissolve in concentrated sulfuric acid and are decomposed by nitric acid. They contain nitrogen, are of complex constitution and contain copper in combined form. Their typical constitution is illustrated by the compound derived from phthalonitrile, which corresponds to the empirical formula $(C_8H_4N_2)_4Cu$, and has a structure which is most probably represented by the following formula:

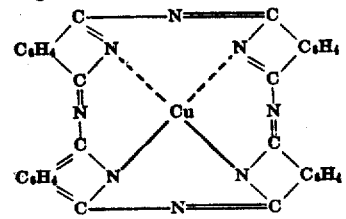

It will be understood, however, that the above formula is not limitative, and does not exclude the possibility of other, especially tautomeric, arrangements.

The copper-containing coloring matters from substituted phthalonitriles and copper or copper compounds appear to be substituted derivatives of the above. Cupric chloride gives a coloring matter containing chlorine.

Combination is preferably effected by submitting the o-arylene dicyanide to the action of heat in the presence of a cupriferous reagent, such as metallic copper, or cuprous or cupric compounds. Particularly valuable embodiments of this process are the manufacture of coloring matters by heating phthalonitrile with copper or copper compounds in the absence of any solvent whatever or in the presence of a non-basic, high-boiling organic diluent such as naphthalene or alpha-chloro-naphthalene.

Working according to this new process the coloring matters are, generally speaking, formed with greater readiness than according to those of the above-mentioned specifications and higher yields, in some cases nearly the theoretical, are obtained. Purification may be effected as already described in the said specifications, that is by dissolving the crude pigment in concentrated sulfuric acid, and then reprecipitating it by dilution.

The coloring matters may be employed as pigments. For instance, they may be made into lakes with the usual substrata. Such lakes may be used as coloring matters for varnishes and inks.

The following examples in which parts are by weight illustrate but do not limit the invention.

*Example 1*

Phthalonitrile and precipitated copper in the proportion of 4 molecules of the first to 1 atom of the latter, are heated together for about 180 to 250 C. until pigment formation is complete, the reaction-mass is freed from excess phthalonitrile and purified from sulfuric acid. The resulting compound we believe to be the same as the copper compound described in British patent specification No. 322,169, except for a superior purity and resulting increased brilliance and tinctorial power. It also appears to belong in the same general class with the copper compound described by de Diesbach and von der Weid, Helvetical Chimica Act (1927), 10, 886, but it does not have the empirical composition which de Diesbach et al. ascribed to their compound, and it certainly does not contain combined pyridine or any other base. It is a greenish-blue pigment, which sublimes apparently unchanged at about 400° C. It is barely soluble in quinoline, but dissolves in concentrated sulfuric acid at 0° C., from which it can be recovered in 90% yield on dilution with water. Warming with concentrated nitric acid decomposes it into phthalimide and copper nitrate. It contains 66.9% carbon, 2.78% hydrogen, 19.14% nitrogen and 11.03% copper and its constitution appears to be as formulated on page 3.

*Example 2*

A mixture of 12.8 parts of phthalonitrile and 2.5 parts of cuprous chloride is heated gently in a stream of nitrogen. A vigorous reaction takes place and after a few minutes, the mass becomes almost solid. This mass is allowed to cool, broken and extracted with boiling water. After filtering the residue is boiled successively with dilute acid, and alcohol, filtered after each boiling and finally washed with water and dried. The resulting bright blue pigment appears to be substantially the same as the product of Example 1. It does contain, however, combined chlorine, and apparently consists of a mixture of the copper-phthalocyanine obtained in Example 1, $(C_8H_4N_2)_4Cu$, and of a chlorinated derivative thereof. The latter is more fully identified and claimed in copending application of Linstead and Dent, Serial No. 79,816, filed May 14, 1936 (Patent No. 2,129,013 issued September 6, 1938).

In lieu of copper and cuprous chloride as used in Examples 1 and 2, one may employ cuprous cyanide, cuprous and cupric oxides, cupric sulfide, cupric chloride, cupric acetate and cupric sulfate. Indeed, we believe that any compound of copper which is capable of yielding copper compounds when reacted for instance with an acid will give the copper-phthalocyanine if heated with phthalonitrile at suitable temperatures in a suitable medium. When cupric chloride is used the resulting pigment contains chloride, but otherwise appears to have the same structure as copper-phthalocyanine.

*Example 3*

4-chlorophthalonitrile (prepared from 4-chlorophthalic anhydride by heating with urea to give the imide, heating this with ammonia, to give the diamide and boiling the diamide with acetic anhydride) and copper (as copper bronze) in the proportion of four molecules of the first to one atom of the second are heated together at 220° C. for 5 to 10 minutes. A crude blue product containing chlorine is obtained in about 70% yield. This is purified from concentrated sulfuric acid, as previously mentioned, when a 65% recovery of what appears to be a pure tetrachloro derivative of the copper compound formulated above is obtained. Its empirical formula is $$(C_8H_3ClN_2)_4Cu$$

*Example 4*

3 - nitrophthalonitrile (made from 3 - nitrophthalic acid as 4-chloro-phthalonitrile is made from 4-chlorophthalic anhydride in Example 3) and copper bronze are heated to 220° C. in methyl-naphthalene. The methylnaphthalene is removed and the residue purified with concentrated sulfuric acid. A good yield of pigment is obtained and this appears to be a tetranitro derivative of the copper compound formulated above. Its empirical formula is therefor $[C_8H_3(NO_2)N_2]_4Cu$.

4-nitrophthalonitrile also readily gives a coloring matter containing copper.

Phthalonitrile may be prepared by the process of copending application Serial No. 706,150 (Patent No. 2,054,088, issued September 15, 1936), or in any other suitable manner.

In Helvetica Chimica Acta (1927), 10, 886 de Diesbach and von der Weid describe the production of complex salts of o-dinitriles, copper and pyridine by heating o-dibromobenzene or 1:2-dimethyl-4:5-dibromobenzene or 1:2-dibromo-naphthalene with cuprous cyanide in pyridine or by heating phthalonitrile with cuprous bromide in pyridine, the products being indigo blue or green colored bodies to which de Diesbach and von der Weid assign the formula $[C_6H_4(CN)_2+C_5H_5N]_2Cu$, $[C_6H_2(CH_3)_2(CN)_2+C_5H_5N]_2Cu$, and $[C_{10}H_6(CN)_2+C_5H_5N]_2Cu$.

In the case of the first of these compounds, de Diesbach and Weid found by analysis the following percentage composition:

|  | C | H | N | Cu |
|---|---|---|---|---|
| Found | 65.64 | 4.00 | 17.74 | 12.88 |
| Calculated for $C_{26}H_{18}N_6Cu$ | 65.31 | 3.80 | 17.59 | 13.30 |

The copper-phthalocyanine, however, prepared according to Example 1 of this application was found to possess the following percentage composition:

|  | C | H | N | Cu |
|---|---|---|---|---|
| Found | 66.9 | 2.78 | 19.14 | 11.03 |
| Calculated for $C_{32}H_{16}N_8Cu$ | 66.68 | 2.79 | 19.48 | 11.05 |

These data show that the present process gives a pure compound adapted for technical use forthwith, whereas de Diesbach's process gave a product the composition of which is either that of a compound of only scientific interest or that of an impure substance.

It will be understood that our invention is susceptible of wide variation and modification without departing from the spirit thereof, as defined by the subjoined claims.

In the claims below, the expression "cupriferous reagent" is means to include any reagent which is adapted to furnish copper atoms for chemical exchange reactions, and includes both metallic copper as well as compounds thereof whether in cuprous or cupric state.

We claim:

1. Process for the manufacture of phthalocyanine coloring matters which comprises heating a mixture consisting of an o-arylenedicyanide and a cupriferous reagent, until the formation of a blue to green, solid coloring matter, and recovering said coloring matter.

2. Process for the manufacture of phthalocyanine coloring matters which comprises heating a mixture consisting of a phthalonitrile and a cupriferous reagent capable of yielding copper atoms, at a temperature between 180° and 250° C., and recovering the coloring matter thus produced.

3. Process for the manufacture of phthalocyanine coloring matters which comprises heating a mixture consisting of phthalonitrile and metallic copper in the proportion of substantially 4 moles of the former to 1 atom of the latter, at a temperature of about 180° to 250° C. until a greenish-blue pigment has been formed, freeing the reaction mass from unconsumed phthalonitrile, and purifying the pigment by dissolution in sulfuric acid and subsequent dilution.

4. Process for the manufacture of phthalocyanine coloring matters which comprises heating a mixture consisting of a halogen-phthalonitrile and copper in the proportion of substantially 4 moles of the former to 1 atom of the latter, at a temperature of about 220° C. until a bluish pigment has been formed, separating the latter from unreacted initial material, and purifying the same by dissolution in sulfuric acid and subsequent dilution.

ISIDOR MORRIS HEILBRON.
FRANCIS IRVING.
REGINALD PATRICK LINSTEAD.

CERTIFICATE OF CORRECTION.

Patent No. 2,166,213.     July 18, 1939.

ISIDOR MORRIS HEILBRON, ET AL.

It is hereby certified that error appears in the printed specification of the above numbered patent requiring correction as follows: Page 2, first column, line 23, for the word "Act" read Acta; and second column, line 12, for the formula "$(C_2H_3ClN_2)_4Cu$" read $C_8H_3ClN_2)_4Cu$; line 74, for "means" read meant; and that the said Letters Patent should be read with this correction therein that the same may conform to the record of the case in the Patent Office.

Signed and sealed this 19th day of September, A. D. 1939.

(Seal)     Henry Van Arsdale,
Acting Commissioner of Patents.

chemical exchange reactions, and includes both metallic copper as well as compounds thereof whether in cuprous or cupric state.

We claim:

1. Process for the manufacture of phthalocyanine coloring matters which comprises heating a mixture consisting of an o-arylenedicyanide and a cupriferous reagent, until the formation of a blue to green, solid coloring matter, and recovering said coloring matter.

2. Process for the manufacture of phthalocyanine coloring matters which comprises heating a mixture consisting of a phthalonitrile and a cupriferous reagent capable of yielding copper atoms, at a temperature between 180° and 250° C., and recovering the coloring matter thus produced.

3. Process for the manufacture of phthalocyanine coloring matters which comprises heating a mixture consisting of phthalonitrile and metallic copper in the proportion of substantially 4 moles of the former to 1 atom of the latter, at a temperature of about 180° to 250° C. until a greenish-blue pigment has been formed, freeing the reaction mass from unconsumed phthalonitrile, and purifying the pigment by dissolution in sulfuric acid and subsequent dilution.

4. Process for the manufacture of phthalocyanine coloring matters which comprises heating a mixture consisting of a halogen-phthalonitrile and copper in the proportion of substantially 4 moles of the former to 1 atom of the latter, at a temperature of about 220° C. until a bluish pigment has been formed, separating the latter from unreacted initial material, and purifying the same by dissolution in sulfuric acid and subsequent dilution.

ISIDOR MORRIS HEILBRON.
FRANCIS IRVING.
REGINALD PATRICK LINSTEAD.

CERTIFICATE OF CORRECTION.

Patent No. 2,166,213.  July 18, 1939.

ISIDOR MORRIS HEILBRON, ET AL.

It is hereby certified that error appears in the printed specification of the above numbered patent requiring correction as follows: Page 2, first column, line 23, for the word "Act" read Acta; and second column, line 12, for the formula "$(C_2H_3ClN_2)_4Cu$" read $C_8H_3ClN_2)_4Cu$; line 74, for "means" read meant; and that the said Letters Patent should be read with this correction therein that the same may conform to the record of the case in the Patent Office.

Signed and sealed this 19th day of September, A. D. 1939.

Henry Van Arsdale,
Acting Commissioner of Patents.

(Seal)